United States Patent [19]

Caserta et al.

[11] Patent Number: 4,611,378
[45] Date of Patent: Sep. 16, 1986

[54] METHOD OF MAKING A FIBER OPTIC STRAIN SENSOR

[75] Inventors: Anthony L. Caserta, Lloyd Harbor; Russell W. Squires, Dix Hills; Nicholas C. Szuchy, Babylon, all of N.Y.

[73] Assignee: Grumman Aerospace Corporation, Bethpage, N.Y.

[21] Appl. No.: 674,784

[22] Filed: Nov. 26, 1984

Related U.S. Application Data

[62] Division of Ser. No. 451,495, Dec. 20, 1982, abandoned.

[51] Int. Cl.[4] .................. B23Q 17/00; B23P 17/00; G01D 11/16
[52] U.S. Cl. .................. 29/407; 29/415; 29/411; 356/32
[58] Field of Search .................. 356/32, 34; 29/411, 29/412, 413, 415, 416, 418, 407

[56] References Cited

U.S. PATENT DOCUMENTS

| | | | |
|---|---|---|---|
| 2,957,226 | 10/1960 | Dibner | 29/412 |
| 3,037,271 | 6/1962 | Schilberg | 29/415 |
| 3,484,350 | 12/1969 | Zaremski | 29/415 |
| 3,531,847 | 10/1970 | Wallerstein | 29/411 |
| 3,962,900 | 6/1976 | Leiblich | 29/415 |

Primary Examiner—Howard N. Goldberg
Assistant Examiner—Steven Nichols
Attorney, Agent, or Firm—Richard G. Geib; Daniel J. Tick; Bernard S. Hoffman

[57] ABSTRACT

First and second tabs are affixed to the surface of a body in close proximity with each other and in partially side by side relation. First and second optical fibers are affixed to the first and second tabs, respectively, and are movable therewith. The optical fibers are positioned transverse to the tabs and in alignment about a mechanical quiescent point in the absence of strain in the body. A source of light produces and directs light through the first and second optical fibers. A light detector detects light transmitted through the first and second optical fibers and determines the intensity thereof, which is proportional to the magnitude of compression and tension strains in the body.

3 Claims, 6 Drawing Figures

METHOD OF MAKING A FIBER OPTIC STRAIN SENSOR

This application is a division, of application Ser. No. 451,495, filed Dec. 20, 1982, now abandoned.

BACKGROUND OF THE INVENTION

The present invention relates to a fiber optic strain sensor.

Resistive type strain sensors or gages are generally low in sensitivity and stability, possess low gage factors, and are susceptible to electromagnetic interference.

Until recently, the primary objective in fiber optic utilization was transmission of signals requiring a wide band media such as offered by the fiber optics. However, it is also important to consider cases in which the parameter to be measured causes a change in the transmission properties of the fiber itself. In such cases the fiber takes an active part in the detection process. Tab designs handling various fiber sizes were investigated.

Also investigated were both static and dynamic responses comparing fiber optics with resistive strain sensors. Attention was focused on the dynamic comparison of the responses through the utilization of computer programs for presentation and analysis of data. Computer response analysis is essential for quickly evaluating comparison tests for correlation data. Because of their increased sensitivity, due to the less than one square inch size of the fiber optic transducer, and responsiveness due to the areal changes of the fiber optic sensor, the strain tracking capability of fiber optic sensors is excellent.

A comparison of typical systems indicates that a strain induced intensity modulation system is optically simpler, since no interferometry is necessary. However, in both cases, detection finally results from photodetection of optical intensity signals.

The principal object of the invention is to provide a strain sensor which is immune to electromagnetic interference.

An object of the invention is to provide a strain sensor having high gage factors relative to resistive type strain sensors.

Another object of the invention is to provide a strain sensor of great sensitivity, considerably more sensitive than resistive type strain sensors.

Still another object of the invention is to provide a strain sensor of great stability, more stable than resistive type strain sensors.

Yet another object of the invention is to provide a method of manufacture of a pair of tabs for the fiber optic strain sensor if the invention, which method provides ease of handling, mounting, use and fabrication.

An object of the invention is to provide a method of manufacture of a pair of tabs for the fiber optic strain sensor of the invention, which method mechanically develops and maintains the required tolerances for the transconductance quiescent point.

The strain sensors of the invention possess high gage factors/sensitivity, stability and immunity to electromagnetic interference. With high gage sensitivity, the sensors can sense smaller strains and offer better performance capability than resistive type gages. In addition, the sensors of the invention tend to be more stable since their operating or quiescent point is not dependent upon a null or zero crossing effect. Since the sensors are immune to electromagnetic interference, less signal conditioning is required for signal extraction.

BRIEF SUMMARY OF THE INVENTION

In accordance with the invention, a fiber optic strain sensor for sensing compression and tension strains in a body having a surface comprises first and second tabs affixed to the surface in close proximity with each other and in at least partially side by side relation. First and second optical fibers are affixed first and second tabs, respectively, and movable therewith. The optical fibers are positioned transverse to the tabs and in alignment about a mechanical quiescent point in the absence of strain in the body. A source of light produces and directs light through the first and second optical fibers. A light detector detects light transmitted through the first and second optical fibers and determines the intensity thereof. The intensity is substantially proportional to the magnitude of compression and tension strains in the body. The light detector has an output and produces at the output signals proportional to the magnitude of compression and tension strains in the body.

The first and second optical fibers are positioned in a predetermined mechanical misalignment relative to each other.

The compression and tension strains are in determined directions in the body and the first and second tabs are positioned in substantially parallel relation with each other and extend in the determined directions.

The first and second tabs consist of the same material as the body to minimize temperature effects.

Adhesive affixes the first and second tabs to the surface of the body. The adhesive comprises organic cement and inorganic adhesive.

The optical fibers are positioned substantially perpendicularly to the tabs.

The source of light is non-coherent and comprises a light emitting diode.

The source of light may comprise a laser diode.

An amplifier amplifies the output of the light detector. An output electrically connected to the amplifier provides a readout of the magnitude of compression and tension strains in the body.

The light emitting diode emits infrared at a wavelength of substantially 820 micrometers.

In accordance with the invention, a fiber optic strain sensor for sensing compression and tension strains in a body having a surface, the compression and tension strains being in determined directions in the body, comprises a first substantially elongated tab affixed to the surface of the body and extending in substantially the determined directions. A second substantially elongated tab is affixed to the surface in close proximity with the first tab and extends in substantially the determined directions in at least partially side by side relation with the first tab. A first optical fiber is affixed to, and movable with, the first tab. The first optical fiber has an inner end and a spaced opposite outer end. A second optical fiber is affixed to, and movable with, the second tab. The second optical fiber has an inner end in close proximity with the inner end of the first optical fiber and a spaced opposite outer end. The first and second optical fibers are positioned transverse to the determined directions and in a predetermined misalignment, providing a mechanical quiescent point, with each other in the absence of strain in the body. A source of light produces and directs light through the first and second optical fibers from the outer end of one of the optical fibers. A light detector detects light emitted from the outer end of the other of the optical fibers and determines the intensity thereof. The intensity is substantially proportional to linear shifting of the optical fibers relative to each other about the mechanical quiescent point and thereby substantially proportional to shifting of the tabs relative to each other due to compression and tension strains in the body so that the intensity is proportional to the strains. The light detector has an output and produces at the output signals proportional to the magnitude of compression and tension strains in the body.

The first and second tabs are in substantially parallel relation with each other.

The first and second tabs consist of the same material as the body to minimize temperature effects.

Adhesive affixes the first and second tabs to the surface of the body. The adhesive comprises organic cement and inorganic adhesive.

The optical fibers are positioned substantially perpendicularly to the predetermined directions.

The source of light is non-coherent and comprises a light emitting diode.

The source of light comprises a laser diode.

An amplifier amplifies the output of the light detector. An output electrically connected to the amplifier provides a readout of the magnitude of compression and tension strains in the body.

The light emitting diode emits infrared at a wavelength of substantially 820 micrometers.

In accordance with the invention, a method of manufacture of a pair of tabs for a fiber optic strain sensor for mounting a pair of optical fibers of the sensor in a predetermined misalignment relative to each other comprises the steps of cutting a rectangle of material with a first pair of spaced substantially parallel length sides of predetermined length and a second pair of spaced substantially parallel width sides shorter than the length sides and substantially perpendicular thereto, the material having a substantially planar top surface and a substantially planar bottom surface substantially parallel to the top surface and spaced a predetermined thickness therefrom. A fine line is cut through the material substantially parallel to and substantially equidistant from the length sides and extending from a first point spaced from one of the width sides to a second point spaced from the other of the width sides. A line colinear with the fine line is scored from the first and second points to the width sides to facilitate dividing the rectangle into first and second identical halves. A first trough is formed in the top surface substantially parallel to and substantially equidistant from the width sides and extending from one of the length sides to the fine line. A second trough is formed in the top surface substantially parallel to and substantially equidistant from the width sides and extending from the other of the length sides to the fine line in misalignment with the first trough. A first pair of spaced lines are scored substantially parallel to and spaced from the width sides and extending from the one of the length sides to the fine line to bound a tab. A second pair of spaced lines are scored substantially parallel to and spaced from the width sides and extending from the other of the length sides to the fine line to bound another tab.

One of the first pair of spaced lines is scribed and one of the second pair of spaced lines is scribed.

The colinear and first and second pairs of lines are scored in the bottom surface.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENT

Figure 1:
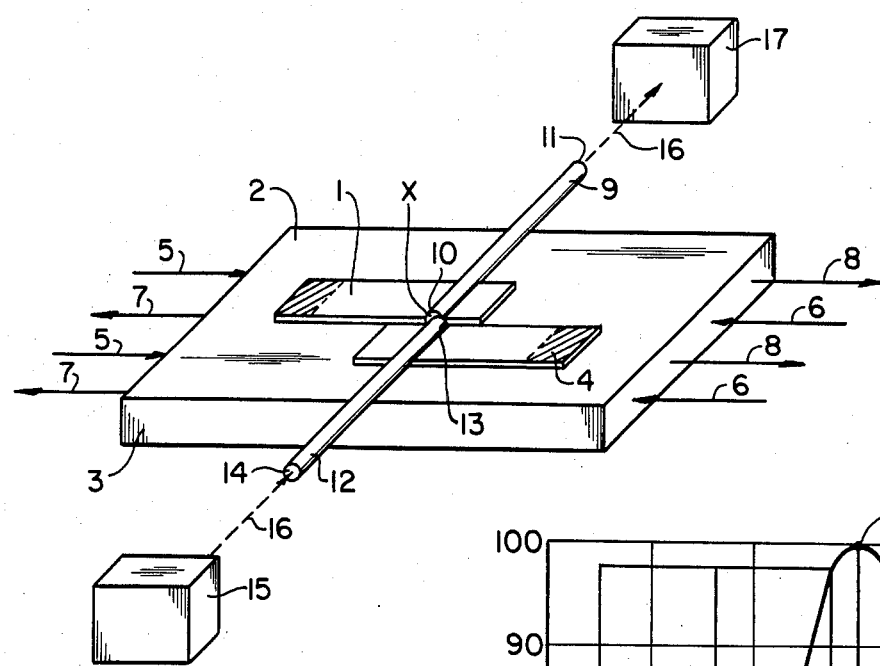
FIG. 1 is a schematic diagram of an embodiment of the fiber optic strain sensor of the invention.

FIG. 1 is a schematic diagram of an embodiment of the fiber optic strain sensor of the invention. In FIG. 1, a first tab 1 is affixed to a surface 2 of a body 3, compression and tension strains of which are to be measured. A second tab 4 is affixed to the surface 2 in close proximity with the first tab 1 in at least partially side by side relation with said first tab, as shown in FIG. 1. The first and second tabs 1 and 4 consist of the same material to minimize temperature effects and are mounted in parallel relation with each other and extend in the directions of compression strains or forces, indicated by arrows 5 and 6, and tension strains or forces, indicated by arrows 7 and 8.

When the body 3 is subjected to compression and compression strains appear therein, the tabs 1 and 4 move toward each other in the direction of the arrows 5 and 6. When the body 3 is subjected to tension and tension strains appear therein, the tabs 1 and 4 move away from each other in the direction of arrows 7 and 8.

Figure 3:
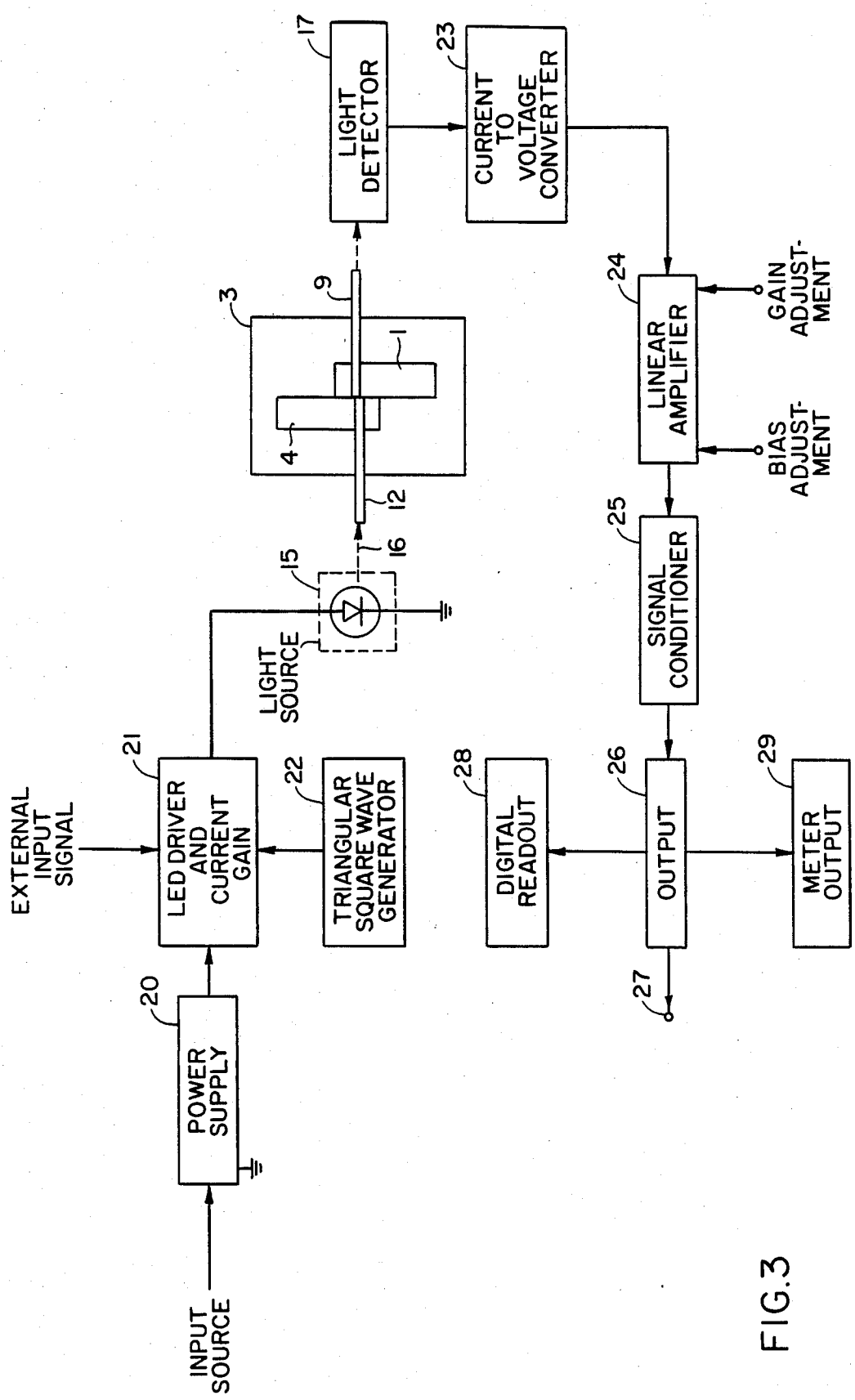
FIG. 3 is a block diagram of an embodiment of the circuit of the fiber optic strain sensor of FIG. 1.

A first optical fiber 9 is affixed to, and movable with, the first tab 1 and has an inner end 10 and a spaced opposite outer end 11 (FIG. 1). A second optical fiber 12 is affixed to, and movable with, the second tab 4 and has an inner end 13 in close proximity with the inner 10 of the first optical fiber 9 and a spaced opposite outer end 14. The first and second optical fibers 9 and 12, respectively, are positioned transverse, and essentially perpendicular, to the tabs 1 and 4 and are in alignment about a mechanical quiescent point X in the absence of strain in the body 3. The quiescent point X provided by a predetermined mechanical misalignment or offset of the optical fibers 9 and 12, as shown in FIGS. 1, 3 and 4.

A source of light 15 of any suitable known type directs light 16 through the first and second optical fibers 9 and 12, respectively, from the outer end 14 of the fiber 12, as shown in FIG. 1, or from the outer end 11 of the fiber 9. The source of light 15 may comprise a non-coherent light source consisting of a light emitting diode, or a laser diode, or any suitable source of light. A light detector 17 of any suitable known type detects the intensity of the light 16 emitted from the outer end 11 of the fiber 9, as shown in FIG. 1, or from the outer end 14 of the fiber 12.

Figure 2:
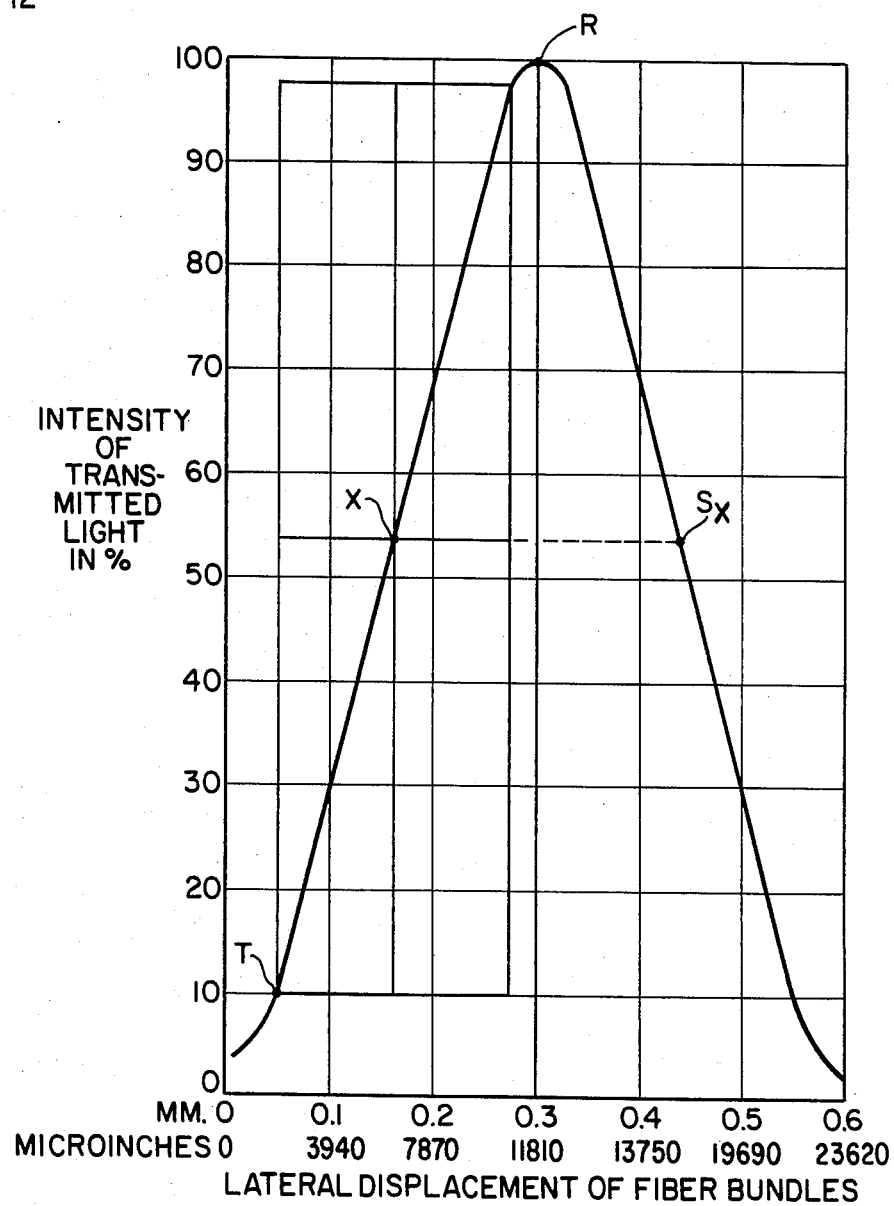
FIG. 2 is a graphical presentation of transmitted light intensity relative to strain-caused shifting of the optical fibers.

The first and second optical fibers 9 and 12, respectively, are in alignment about the typical quiescent point X, as shown in FIGS. 1 and 2, in the absence of strain in the body 3. At such time, the light 16 detected by the light detector 17 has a predetermined, adjusted intensity, as shown in FIG. 2. Since the optical fibers 9 and 12 move with the tabs 1 and 4, respectively, when the body 3 is subjected to compression or tension strain, said fibers shift lineally relative to each other in direct proportion to the shifting of said tabs. The intensity of the light 16 detected by the light detector 17 is indicative of the lineal shifting of the optical fibers 9 and 12 relative to each other and said intensity is proportional to the strains on the body 3.

In FIG. 2, the abscissa represents the displacement of the optical fibers 9 and 12, relative to each other, in microinches and the ordinate represents the light intensity in percent of light transductance. As shown in FIG. 2, as the optical fibers 9 and 12 are shifted or displaced from their quiescent point, in either direction, the intensity of the light 16 transmitted by said fibers varies approximately linearly about said quiescent point.

In FIG. 2, the typical quiescent point is X, an alternate typical quiescent point is R, an alternate quiescent point is $S_Y$ and an alternate quiescent point is T.

Intensity modulation of the light propagating in the core of the optical fiber is readily accomplished by mounting the sensing fibers on the tabs 1 and 4 which mechanically move when subjected to the strain field to be measured, causing lateral displacement between the optical fibers 9 and 12.

The result of a theoretical, that is, when there is no unintercepted illumination loss, analysis considering the intensity modulation variation due to a relative lateral displacement "a" between two single fiber strands is based on the numerical evaluation of Equation (1), as follows.

$$\% \text{ LIGHT TRANSMITTED Y} \quad (1)$$

$$= \left\{ \frac{16}{\pi d^2} \int_0^{\frac{d}{2}\sqrt{1-\left(\frac{a}{d}\right)^2}} \int_{\frac{a}{2}} \sqrt{\left(\frac{d}{2}\right)^2 - v^2}\, dw\, dv \right\} 100$$

$$= \frac{2}{\pi} \left\{ \cos^{-1}\left(\frac{a}{d}\right) - \left(\frac{a}{d}\right) \sin\left[\cos^{-1}\left(\frac{a}{d}\right)\right] \right\} 100$$

This indicates that it is possible to develop straight line least square fit to the curve having a maximum deviation error of about 3.8%, that is, $$\frac{0.03}{0.797} \times 100\%$$

over the total range. An exact fit may be provided by using a microprocessor routine to develop the non-linear output for more exact response data.

Using the linearized expression (2) it is possible to define a family of fiber optic strain gages having different ranges of applicability.

$$\text{Axial Displacement Ratio } (a/d) = 0.85998 - 0.00876T \quad (2)$$

For the percent of light transmitted "T" varying linearly from 10 to 97.5, the axial displacement ratio ($a$/d) variation is given by relationship (3), results in a total range for $a$/d = ±0.383 or $$0.006 \leq a/d \leq 0.772 \quad (3)$$

The linearized relationship given by Equation (2) defines the variation of the strain in terms of the ratio of the change in length to the optical fiber diameter of the bundle.

The development of the gage factor, defined as the amount by which the light transmission area changes in relation to a change in strain, may be readily determined.

$$S_t = \frac{\Delta A/A}{\Delta L/L} \quad (4)$$

The results of the parametric study of gage factor $S_t$ variation as a function of fiber diameter d, in mm, and tab mounting distance L, in inches, may be concisely summarized by the expression:

$$S_t = \frac{33.19L}{d} \quad (5)$$

wherein L equals the tab mounting distance in inches and d equals the fiber diameter in millimeters.

As the fiber diameter decreases, d 0.3 mm=0.012 inch, the effective gage/sensitivity factor increases. However, the fabrication and handling of the fibers also becomes proportionately more difficult. The gage/sensitivity factor is better for a fiber optic strain gage $$S_t = \frac{\Delta A/A}{\Delta L/L}$$

when compared with the gage factor $$K = \frac{\Delta R/R}{\Delta L/L} \approx 2$$

for the resistive type strain gage by at least an order of magnitude. This improvement is attributed partially to increased gain due to the size of the fiber optic transducer of one square inch and responsiveness due to areal changes of the fiber optic sensor. The $S_t$ values are approximately equal to the K values found only in semiconductor gages.

Although various size fibers have been considered for the fiber optic strain sensor, expediency limited the scope to a single strand fibers measuring 0.005, to 1 mm in diameter, or 5 to 1000 microns, respectively. Using these fiber diameters, two different light intensity modulation methods were investigated; the first based on fiber gap size displacement and the second on the axial or lateral displacement of the fiber. The gap type transducer was found to be insensitive to small displacements when compared to the axial displacement type.

Six fiber optic strain gage configurations based on the lateral displacement of the fiber concept measuring nominally one square inch were designed, fabricated and evaluated for ease of construction and utilization. A leading strain gage design is a rigid aluminum mounting tab concept that readily lends itself to ease of handling, mounting, use and fabrication. Tests were performed with the light source operating at a wavelength of 820 micrometers, although other wavelengths may be used, and modulated by a 1000 Hz triangular wave shape. This signal was transmitted through the optical fibers and intensity modulated by the motion of the strain gage. The variation in the light intensity was measured at the output of the receiver by a digital voltmeter (Fluke 280B) and an oscilloscope (Tektronix 4014). A continuous unmodulated light source was used. The plots of the operating results for the 0.3, 0.6, and 1 mm fibers follow the general shape of the ideal theoretical curve, as shown in FIG. 2, peaking when the two fibers are aligned and falling off to either side in an ostensible "bell" shaped curve as the misalignment increases. The rounding of the peak is attributed to the small but still finite and measurable light scattering acceptance-cones that occur at the interface zone of the two fiber elements. Using these measurements, the gage or strain sensitivity factors for the 0.3, 0.6, and 1.0 mm fibers were calculated as 112, 55, and 33, respectively.

The fiber optic strain sensor must operate over a wide range of temperatures from 20° C. to 450° C. Some thermal design considerations include:

1. Thermal expansion effects of substrates, tabs, fibers, etc.
2. Change due to thermal effects on the index of refraction of both core and cladding materials.
3. Thermal effects on adhesives and attachment elements.
4. Thermal effects on the sensitivity characteristic of the light or photo detector and the light source or emitter, and also on associated circuits.

To minimize thermal expansion effects, both the material of the tabs 1 and 4 and the material of the body or substrate 3 should be matched from the standpoint of the thermal coefficient of expansion. Use of identical materials is therefore optimum. Thermal gradients and transients can have an effect if the temperature of both the tabs and substrates are changed in a different fashion. If this occurs, specific temperature will have to be measured and used to obtain true data.

The index of refraction changes for a specific fiber as a function of temperature. This effect occurs in both the core and the cladding. These changes in index of refraction in turn effect other parameters, such as the Critical angle, and therefore the light loss at turns and bends, and the fiber numerical aperture, and therefore the light coupled into and out of the fibers. If the index of refraction of both the core and cladding approach each other, the fiber will no longer properly channel light down the fiber. Therefore, the fiber selected will require transmission tests as a function of temperature over the full temperature range.

The thermal effects on the adhesives used to attach the tabs 1 and 4 to the test element must be carefully studied to ensure minimum thermal creep and adequate bonding strength. The adhesive selection is heavily impacted by the requirements for operation in a vacuum chamber with little or no outgassing allowed. The vacuum requirement eliminates the organic cements, leaving only inorganic adhesives such as ceramics based adhesives. These however, are extremely sensitive to vibration and shock, but are acceptable from an outgassing standpoint. Thus, in order to satisfy the diverse requirements, organic cements are used followed by a coating of inorganic adhesive to minimize the outgassing.

The light source 15 and the light detector 17 and their associated electronic components are preferably located at a distance from any heat-generating apparatus, in order to minimize the effects of temperature therein. Therefore, they will operate over a relatively narrow temperature range from 60° F. to 100° F. The light source and light detector may be temperature compensated over this range by the use of sensor resistors which are temperature-sensitive and vary the current therethrough.

The inventors have tested fiber optic lines in both E and H fields and no interaction was found with light data inside the fibers. Fields of varying intensity and over a frequency level of 10 Hz to multi gigahertz were used but no measurable interactions were noted. Furthermore, the fiber lines were also exposed to radiation amounting to a total dose of $6 \times 10^6$ rads and were also simultaneously monitored to obtain attenuation effects.

The signal intensity attenuated with time due to creation of color centers by photon energy interactions. The actual transmitted signal intensity dropped to 50% of its starting value and then returned back to a 60% value where it remained during a whole week at the benign level of 12 rad/sec. Therefore, presaturated fibers or parallel path approaches must be considered.

The circuit of the fiber optic strain sensor of the invention is shown in FIG. 3. The total power requirements for the single channel fiber optic strain sensor are provided by a power supply 20. All of the components of the circuit of FIG. 3 are of any suitable known type. The input source to the power supply 20 is single phase AC voltage of 60 Hz and provides about 0.5 ampere to the sensor. The power supply 20 is electrically connected to an LED driver and current gain 21. The LED driver and current gain provides the forward current required by the LED for the particular optical power desired. It also modulates that current in response to the external signal or from the input of an triangular square wave generator 22.

An external input signal and the triangular square wave generator 22 are electrically connected to the LED driver and current gain 21. The triangular square wave generator 22 is an NE566V function generator, that is a voltage-controlled oscillator with buffered square wave and triangular output. This permits the use of either an internal modulation source for the LED with varying frequency, a constant DC source for a particular constant optical power output, or an external source signal, as needed. The LED driver and current gain is electrically connected to the light source 15, which comprises an LED and optical converter and provides electrical to optical transducer and fiber coupling functions. The electro/optic transducer of the light source 15 is a LED which emits optical energy in response to the modulating signal. The optical energy is near infrared at 820 micrometers. The coupler or connector mounts the LED so that its optical port is aligned with the core of the optical fibers 12 and 9.

The light or optical detector 17 receives the light or optical energy transmitted by the optical fibers as intensity modulated by the strain sensor. Since the output of the light detector 17 is a high impedance source and its signal is very small, a current to voltage converter 23 is electrically connected and closely coupled to said detector. The converter 23 is a transimpedance amplifier (LM 311 V) which provides signal gain by producing an output voltage proportional to the input current and a low output impedance, The current to voltage converter 23 is electrically connected to a linear amplifier 24 which provides the required gain to meet the signal conditioning and output stage requirements, required, if needed and also provide a bias and gain adjustment function which permits user adjustments of the output levels.

The linear amplifier 24 is electrically connected to a signal conditioner 25, which adjusts the bias voltage. The signal conditioner 25 is electrically connected to an output 26 which provides an output at an output terminal 27 which may be used to externally monitor the response of the strain sensor. The output 26 is electrically connected to a digital readout 28 and a meter output 29 which provide strain indications.

Figure 4A:
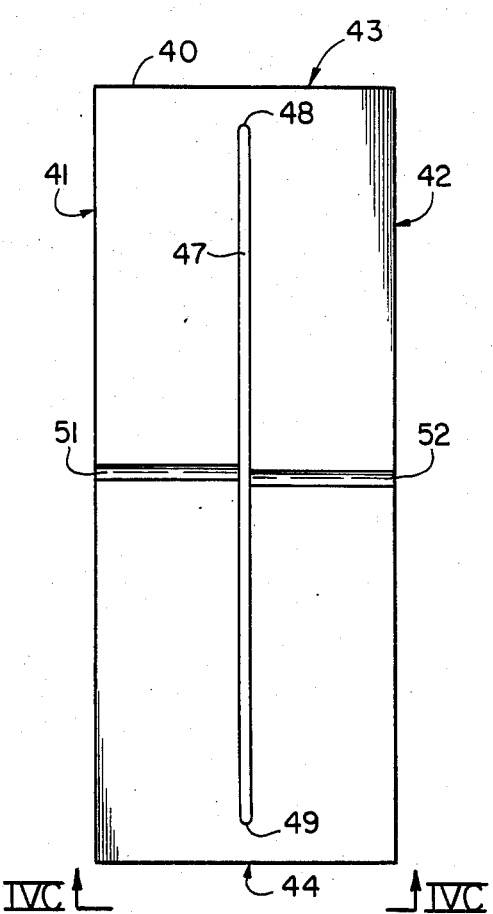
FIG. 4A is a top plan view, on an enlarged scale, of an embodiment of the tabs of the sensor of FIG. 1 illustrating the method of manufacture of the tabs of the invention.
Figure 4B:
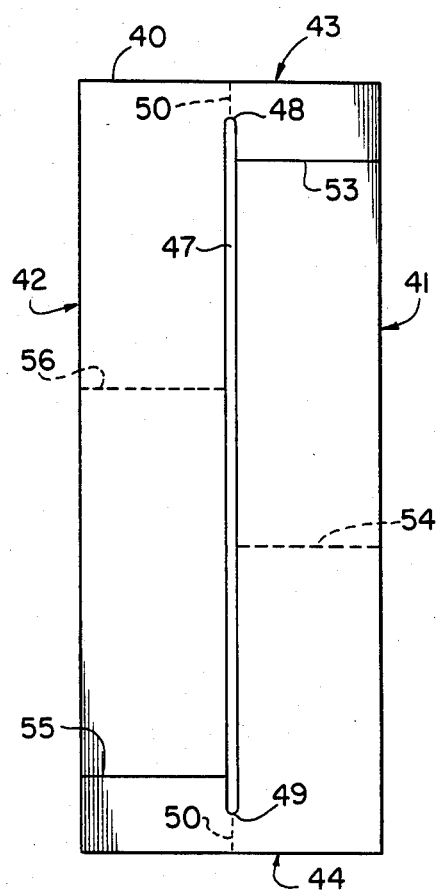
FIG. 4B is a bottom view of the embodiment of FIG. 4A.
Figure 4C:
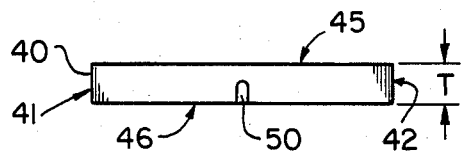
FIG. 4C is an end view, taken along the lines, IVC—IVC, of FIG. 4A.

FIGS. 4A, 4B and 4C show a method of manufacture of the invention for manufacturing the tabs 1 and 4 of FIGS. 1 and 3. In the method of FIGS. 4A, 4B and 4C, a rectangle of material 40 is cut with a first pair of spaced substantially parallel length sides 41 and 42 of predetermined length and a second pair of spaced substantially parallel width sides 43 and 44, shorter than said length sides and substantially perpendicular thereto. The material 40 has a substantially planar top surface 45 (FIG. 4C) and a substantially planar bottom surface 46 substantially parallel to said top surface and spaced a predetermined thickness T (FIG. 4C) therefrom.

In accordance with the invention, a fine line 47 is cut through the material 40 substantially parallel to, and substantially equidistant from, the length sides 41 and 42 and extending from a first point 48 spaced from the width side 43 to a second point 49 spaced from the width side 44, as shown in FIGS. 4A and 4B. A line 50 is scored in the bottom surface 46 colinearly with the fine line 47 from the first point 48 to the width side 43 and from the second point 49 to the width side 44 (FIG. 4B) to facilitate dividing the rectangle into first and second identical halves.

A first trough 51 is formed in the top surface 45 substantially parallel to, and substantially equidistant from, the width sides 43 and 44, as shown in FIG. 4A. The first trough 51 extends from the length side 41 to the fine line 47 (FIG. 4A). The first trough 51 is for accommodating the first optical fiber 9.

A second trough 52 is formed in the top surface 45 substantially parallel to, and substantially equidistant from, the width sides 43 and 44, as shown in FIG. 4A. The second trough 52 extends from the length side 42 to the fine line 47 in misalignment with the first trough 51. Thus, the troughs 51 and 52 are linearly offset. The second trough 52 is for accommodating the second optical fiber 12. The troughs 51 and 52 may be replaced by holes.

A first pair of spaced lines 53 and 54 are scored in the bottom surface 46 substantially parallel to, and spaced from, the width sides 43 and 44 and extending from the length side 41 to the fine line 47, as shown in FIG. 4B, to bound a tab. A second pair of spaced lines 55 and 56 are scored in the bottom surface 46 substantially parallel to, and spaced from, the width sides 43 and 44 and extending from the length side 42 to the fine line 47, as shown in FIG. 4B, to bound the other tab. The lines 53 and 55 are preferably scribed.

The strain sensor has high gage factors relative to resistive type strain sensors. This is accomplished by the use of the aforedescribed method of manufacture of the rigid mounting tab of the invention which readily lends itself to ease of handling, mounting and use and fabrication, while mechanically developing and maintaining the required tolerances for the transconductance quiescent point. The rigid aluminum mounting tab rectangle 40, shown in FIGS. 4A, 4B and 4C, accomplishes this through the use of the aforedescribed scored lines that maintain the tab configuration during handling and mounting of the sensor on the test specimen. Once the tab is set in place, the scored lines permit the removal of the restraining part by cutting along said scored lines. This results in the required configuration. For "in situ" strain measurement, the transconductance quiescent point is mechanically developed with a specially designed alignment tool. This has been extended to plastic tabs, stainless steel and machinable glass designs for use in extra-high temperature environments of approximately 1000° C.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves to all modifications that may fall within the scope of the appended claims.

We claim:

1. A method of manufacture of a pair of tabs for a fiber optic strain sensor for mounting a pair of optical fibers of said sensor in a predetermined misalignment relative to each other, said method comprising the steps of cutting a rectangle of material with a first pair of spaced substantially parallel length sides of predetermined length and a second pair of spaced substantially parallel width sides shorter than said length sides and substantially perpendicular thereto, said material having a substantially planar top surface and a substantially planar bottom surface substantially parallel to said top surface and spaced a predetermined thickness therefrom:

cutting a fine line through said material substantially parallel to and substantially equidistant from said length sides and extending from a first point spaced from one of said width sides to a second point spaced from the other of said width sides;

scoring a line colinear with said fine line from said first and second points to said width sides to facilitate dividing said rectangle into first and second identical halves;

forming a first trough in said top surface substantially parallel to and substantially equidistant from said width sides and extending from one of said length sides to said fine line;

forming a second trough in said top surface substantially parallel to and substantially equidistant from said width sides and extending from the other of said length sides to said fine line in misalignment with said first trough:

scoring a first pair of spaced lines substantially parallel to and spaced from said width sides and extending from said one of said length sides to said fine line to bound a tab; and scoring a second pair of spaced lines substantially parallel to and spaced from said width sides and extending from said other of said length sides to said fine line to bound another tab.

2. A method of manufacture as claimed in claim 1, wherein one of said first pair of spaced lines is scribed and one of said second pair of spaced lines is scribed.

3. A method of manufacture as claimed in claim 1, wherein said colinear and first and second pairs of lines are scored in said bottom surface.

* * * * *